(12) United States Patent
Woolf et al.

(10) Patent No.: US 7,668,512 B2
(45) Date of Patent: Feb. 23, 2010

(54) TRANSCEIVER WITH A TEST MODE OF OPERATION

(75) Inventors: Kevin Reid Woolf, Salinas, CA (US); Angeline Young Rodriguez, East Palo Alto, CA (US); Peter H. Mahowald, Los Altos, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 502 days.

(21) Appl. No.: 10/346,480

(22) Filed: Jan. 15, 2003

(65) Prior Publication Data

US 2004/0203443 A1    Oct. 14, 2004

(51) Int. Cl.
    *H04B 17/00* (2006.01)
    *H04B 10/08* (2006.01)

(52) U.S. Cl. ............... 455/67.11; 455/67.14; 455/425; 398/9; 398/16; 398/22

(58) Field of Classification Search ............ 455/423, 455/425, 67.11–67.14, 226.1–226.4; 398/9, 398/16, 17, 22–25
    See application file for complete search history.

(56) References Cited

U.S. PATENT DOCUMENTS

| | | | |
|---|---|---|---|
| 4,449,247 A | 5/1984 | Waschka, Jr. | |
| 4,918,623 A | 4/1990 | Lockitt et al. | |
| 4,945,229 A | 7/1990 | Daly et al. | |
| 4,945,541 A | 7/1990 | Nakayama | |
| 5,019,769 A | 5/1991 | Levinson | |
| 5,255,086 A * | 10/1993 | McMullan et al. | 725/131 |
| 5,345,230 A | 9/1994 | Jackson et al. | |
| 5,812,572 A * | 9/1998 | King et al. | 372/38.04 |
| 5,953,372 A * | 9/1999 | Virzi | 375/224 |
| 5,953,690 A * | 9/1999 | Lemon et al. | 702/191 |
| 5,970,430 A * | 10/1999 | Burns et al. | 702/122 |
| 6,026,104 A | 2/2000 | Itou | |
| 6,201,820 B1 | 3/2001 | Palmer | |
| 6,216,095 B1 | 4/2001 | Glista | |
| 6,236,952 B1 * | 5/2001 | Jun et al. | 702/119 |
| 6,253,060 B1 | 6/2001 | Komara et al. | |
| 6,256,483 B1 * | 7/2001 | Moerder et al. | 455/115.1 |
| 6,324,197 B1 | 11/2001 | Suda | |
| 6,356,515 B1 * | 3/2002 | Kumita et al. | 369/13.26 |
| 6,407,402 B1 * | 6/2002 | Ghaseminejad | 250/551 |
| 6,424,630 B1 | 7/2002 | Ang | |
| 6,426,813 B1 * | 7/2002 | Swenson et al. | 398/9 |

(Continued)

FOREIGN PATENT DOCUMENTS

EP    0018517    4/1980

(Continued)

OTHER PUBLICATIONS

SFF Committee "Information Specification for SFP (Small Formfactor Pluggable) Transceiver", SFF-8074i, Rev 1.0, pp. 1-38 (May 12, 2001), <ftp://ftp.seagate.com/sff>.

(Continued)

*Primary Examiner*—Duc M Nguyen

(57) ABSTRACT

A system comprising a host and a transceiver coupled to the host is provided where the transceiver is configured to receive a request from a host and cause a test mode of operation to be entered in response to receiving the request.

19 Claims, 5 Drawing Sheets

U.S. PATENT DOCUMENTS

| | | | |
|---|---|---|---|
| 6,446,867 B1 | 9/2002 | Sanchez | |
| 6,512,617 B1* | 1/2003 | Tanji et al. | 398/137 |
| 6,590,644 B1* | 7/2003 | Coin et al. | 356/218 |
| 6,599,038 B1 | 7/2003 | Henderson | |
| 6,687,642 B2* | 2/2004 | Maher et al. | 702/127 |
| 6,832,075 B1 | 12/2004 | Henry, Jr. | |
| 7,079,775 B2* | 7/2006 | Aronson et al. | 398/137 |
| 7,155,133 B2* | 12/2006 | Stewart et al. | 398/202 |
| 7,168,029 B2* | 1/2007 | Lai et al. | 714/781 |
| 7,206,710 B2* | 4/2007 | Zhou et al. | 702/107 |
| 2002/0027688 A1* | 3/2002 | Stephenson | 359/152 |
| 2003/0053170 A1* | 3/2003 | Levinson et al. | 359/152 |
| 2003/0135637 A1* | 7/2003 | Huang et al. | 709/232 |
| 2003/0152118 A1* | 8/2003 | Chieng et al. | 372/34 |
| 2003/0152139 A1* | 8/2003 | Khorram | 375/219 |
| 2004/0208501 A1* | 10/2004 | Saunders et al. | 398/9 |

FOREIGN PATENT DOCUMENTS

| | | |
|---|---|---|
| EP | 0412220 | 8/1989 |
| WO | WO-2003/069439 | 8/2003 |

OTHER PUBLICATIONS

SFF Committee "Specification for Diagnostic Monitoring Interface for Optical Xcvrs", SFF-8472, Rev 9.3, pp. 1-10 and 1-29, (Aug. 1, 2002), <ftp://ftp.seagate.com/sff>.

* cited by examiner

TRANSCEIVER WITH A TEST MODE OF OPERATION

THE FIELD OF THE INVENTION

The present invention generally relates to transceivers and, more particularly, to a transceiver with a test mode of operation.

BACKGROUND OF THE INVENTION

Transceivers and other electronic devices may need calibration or tuning functions to be performed on one or more components of the device before the device can be operated properly. Because the failure to perform these calibration or tuning functions correctly can cause a transceiver to malfunction, the calibration and tuning functions are generally performed by a manufacturer or an authorized service technician. A customer or other end user of the transceiver is generally not permitted to access any of the calibration or tuning functions.

In some transceivers, the calibration and tuning functions may be performed on some components prior to the components being installed in the transceiver. These transceivers may have the various parameters and constants used in the calibration and tuning functions stored in the transceiver such that this information is either not accessible by a host connected to the transceiver or not alterable by such a host.

In other transceivers, however, the various parameters and constants used in the calibration and tuning functions may be accessible and/or alterable by a host. Although the information may be accessible by a host, a manufacturer may wish to prevent a customer or end user from accessing or altering the information in the transceiver to ensure proper and safe operation of the device.

It would be desirable to be able to allow a manufacturer to access and alter certain information in a transceiver while preventing customer or end user from accessing or altering the information.

SUMMARY OF THE INVENTION

The present disclosure provides a system comprising a host and a transceiver coupled to the host where the transceiver is configured to receive a request from a host and cause a test mode of operation to be entered in response to receiving the request.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A transceiver with a test mode of operation is shown and described herein. In response to being powered up or reset, a transceiver determines whether all calibration steps associated with the transceiver have been completed. If all of the steps have not been completed, then the transceiver enters a test mode of operation and performs calibration steps in conjunction with a host. After all of the steps have completed successfully, the transceiver enters a customer mode of operation and indicates its readiness to ship to an end user. If one or more steps do not complete successfully, the steps may be retried and/or failure analysis techniques may be applied to the transceiver. A host may cause the transceiver to re-enter the test mode of operation by providing an appropriate request to the transceiver.

Figure 1:
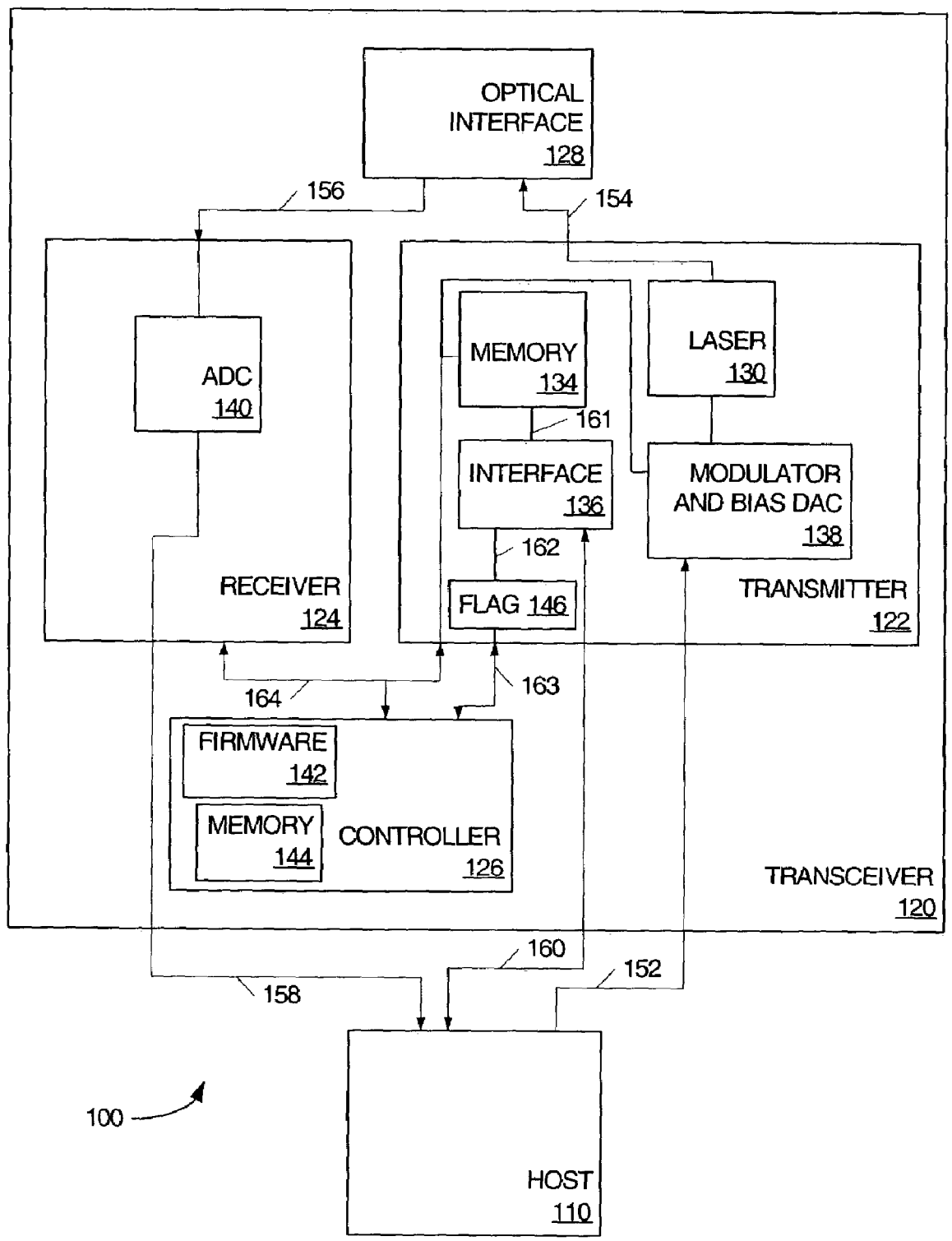
FIG. 1 is a block diagram illustrating an embodiment of a system that includes a transceiver with a test mode of operation.

FIG. 1 is a block diagram illustrating an embodiment of a system 100 that includes a transceiver 120 with a test mode of operation. As shown in FIG. 1, a host 110 is coupled to transceiver 120. Transceiver 120 includes a transmitter 122, a receiver 124, a controller 126, and an optical interface 128. Transmitter 122 includes a laser 130, a memory 134, an interface 136, a modulator and bias digital-to-analog converter (DAC) 138, and a flag 146. Receiver 124 includes an analog-to-digital converter (ADC) 140. Controller 126 includes firmware 142 and a memory 144.

Host 110 may be any type of wired or wireless device configured to operate in conjunction with transceiver 120. Host 110 is external to transceiver 120. Examples of such devices include a test system, a server computer system, a personal computer system, a laptop computer system, a handheld computer system, a personal digital assistant, and a mobile telephone.

Transceiver 120 comprises an optical transceiver configured to communicate with host 110 by sending and receiving electrical signals as described in additional detail herein below. Transceiver 120 also communicates with another device (not shown) by sending and receiving optical signals using optical interface 128. Optical interface 128 may be a Fibre Channel interface or another type of optical interface.

In one embodiment, transceiver 120 conforms to the SFF-8472 Specification for Digital Diagnostic Monitoring Interface for Optical Transceivers as set forth by the SFF (Small Form Factor) Committee. In other embodiments, transceiver 120 may conform to other specifications.

In operation, transmitter 122 comprises an optical transmitter configured to receive digital output signals from host 110 using a connection 152. Modulator and bias DAC 138 converts the digital output signals to analog output signals and provides the analog output signals to laser 130. The digital output signals and the analog output signals comprise electrical signals. Laser 130 generates optical output signals in response to the analog output signals and provides the optical output signals to optical interface 128 using a connection 154.

Receiver 124 comprises an optical receiver configured to receive optical input signals from optical interface 128 using a connection 156. Analog-to-digital converter 140 converts the optical input signals from analog input signals to digital input signals and provides the digital input signals to host 110 using a connection 158. The digital output signals and the analog output signals comprise electrical signals.

Transceiver 120 also communicates with host 110 using an electrical connection 160. In particular, transceiver 120 receives control signals from host 110 using connection 160. Transceiver 120 also provides information to host 110 using connection 160. In the embodiment of FIG. 1, electrical connection 160 couples host 110 to transmitter 122 and is an I2C connection, as provided by the I2C-Bus Specification available from Philips Semiconductors at http://www.semiconductors.philips.com/acrobat/various/I2C_BUS_SPECIFICATION_3.pdf, and interface 136 comprises an I2C bus interface. In addition, connection 160 and interface 136 conform to the 2-wire serial CMOS EEPROM protocol defined for the ATMEL AT24C01A/02/04 family of components, as provided by the ATMEL AT24C01A/02/04 Data Sheet available from Atmel at http://www.atmel.com/atmel/acrobat/doc0180.pdf Interface 136 may comprise hardware or a combination of hardware and software components. Memory 134 may be any type of volatile or non-volatile memory configured to store information. In one embodiment of FIG. 1, memory 134 comprises SRAM.

Controller 126 provides control signals to and receives feedback signals from transmitter 122 and receiver 124 using a connection 164. In the embodiment of FIG. 1, connection 164 is an internal I2C connection, as provided by the I2C-Bus Specification available from Philips Semiconductors at http://www.semiconductors.philips.com/acrobat/various/I2C_BUS_SPECIFICATION_3.pdf, where controller 126 acts as a master and transmitter 122 and receiver 124 act as slaves. In other embodiments, connection 164 may be any other type of serial or parallel connection.

Controller 126 includes firmware 142 that is executable by controller 126 to cause the control signals to be generated and the feedback signals to be received and processed. In other embodiments, controller 126 may include other combinations of hardware and/or firmware or software to perform the functions described herein. Memory 144 may be any type or combination of volatile and non-volatile storage including registers, flash memory, RAM, or EEPROM.

Transceiver 120 includes at least two modes of operation: test mode and customer mode. In both modes, transceiver 120 operates in conjunction with host 110. In the test mode of operation, host 110 causes calibration steps to be performed on transceiver 120. The calibration steps include storing information in transceiver 120 and calibrating and/or tuning transmitter 122, receiver 124, and other components of transceiver 120. The information stored may include manufacturing information, production information, device information, revision information, transmitter 122 settings and parameters including calibration constants of laser 130, receiver 124 settings and parameters including optical modulation amplitude (OMA) tables, clock information, temperature coefficient information, temperature/Vcc calibration constants, and EEPROM information.

In the test mode of operation, transceiver 120 may perform a self test on components of transceiver 120 to verify the functionality and revision information of each component in the test mode of operation. In addition, transceiver 120 provides state information such as register contents from components of transceiver 120 to host 110. Transceiver 120 may further perform internal monitoring tasks in the test mode of operation.

In the test mode of operation, transceiver 120 performs calibration steps in response to requests from host 110. Host 110 provides a request associated with a calibration step to transceiver 120 using interface 136. The request may include a command, an address, and information associated with the command and may include a device address associated with controller 126. Interface 136 causes the request to be stored in memory 134 using a connection 161. In response to the request, interface 136 causes flag 146 to be set using a connection 162 to signal controller 126 that a request has been received. Controller 126 periodically polls flag 146 using a connection 163 and, in response to determining that flag 146 has been set by interface 136, controller 126 accesses the request in memory 134 using the connection 164.

Controller 126 processes the request by performing the calibration step associated with the request. In response to completing the step, controller 126 stores an indicator in memory 144 that indicates that the step has been performed. Controller 126 also provides an indicator to host 110 by storing the indicator in memory 134 using connection 164 and clearing flag 146 using connection 163. Interface 136 detects the indicator in memory 134 either by detecting that flag 146 has been cleared or by monitoring stores to memory 134. In response to detecting the indicator, interface 136 provides the indicator to host 110. Host 110 stores the indicator in a memory (not shown). Host 110 may then cause additional calibration steps to be performed in the manner just described.

After controller 126 completes a calibration step, controller 126 accesses information in memory 144 to determine whether all calibration steps have been completed. The information includes indicators associated with each calibration step that indicate whether each step has been performed successfully. If a step has either not been performed or not been performed successfully, controller 126 causes transceiver 120 to remain in the test mode of operation. If all steps have been performed successfully, then controller 126 causes transceiver 120 to enter the customer mode of operation.

Host 110 may also determine whether all calibration steps have been completed successfully using the indicator received from transceiver 120 for each calibration step. The indicators indicate whether each calibration step has been completed successfully and whether any errors were encountered. Host 110 may also provide a request to transceiver 120 to cause transceiver 120 to exit the test mode of operation. In response to the exit test mode request transceiver 120 provides a indicator that indicates which, if any, of the calibration steps performed on transceiver 120 did not complete successfully. In response to determining that one or more calibration steps did not complete successfully, host 110 may perform failure analysis functions on transceiver 120. In response to determining that all calibration steps completed successfully, host 110 may determine that transceiver 120 is ready to provide to a customer or end user.

In the customer mode of operation, transceiver 120 operates normally in conjunction with host 110. In particular, transceiver 120 receives electrical signals from host 110, converts the electrical signals to optical signals, and provides the optical signals to another device (not shown) using optical interface 128. In addition, transceiver 120 receives optical signals from the other device across optical interface 128, converts the optical signals to electrical signals, and provides the electrical signals to host 110. At any time during the customer mode of operation, host 110 can cause transceiver 120 to re-enter the test mode of operation by providing a request to enter test mode to transceiver 120.

Figure 2:
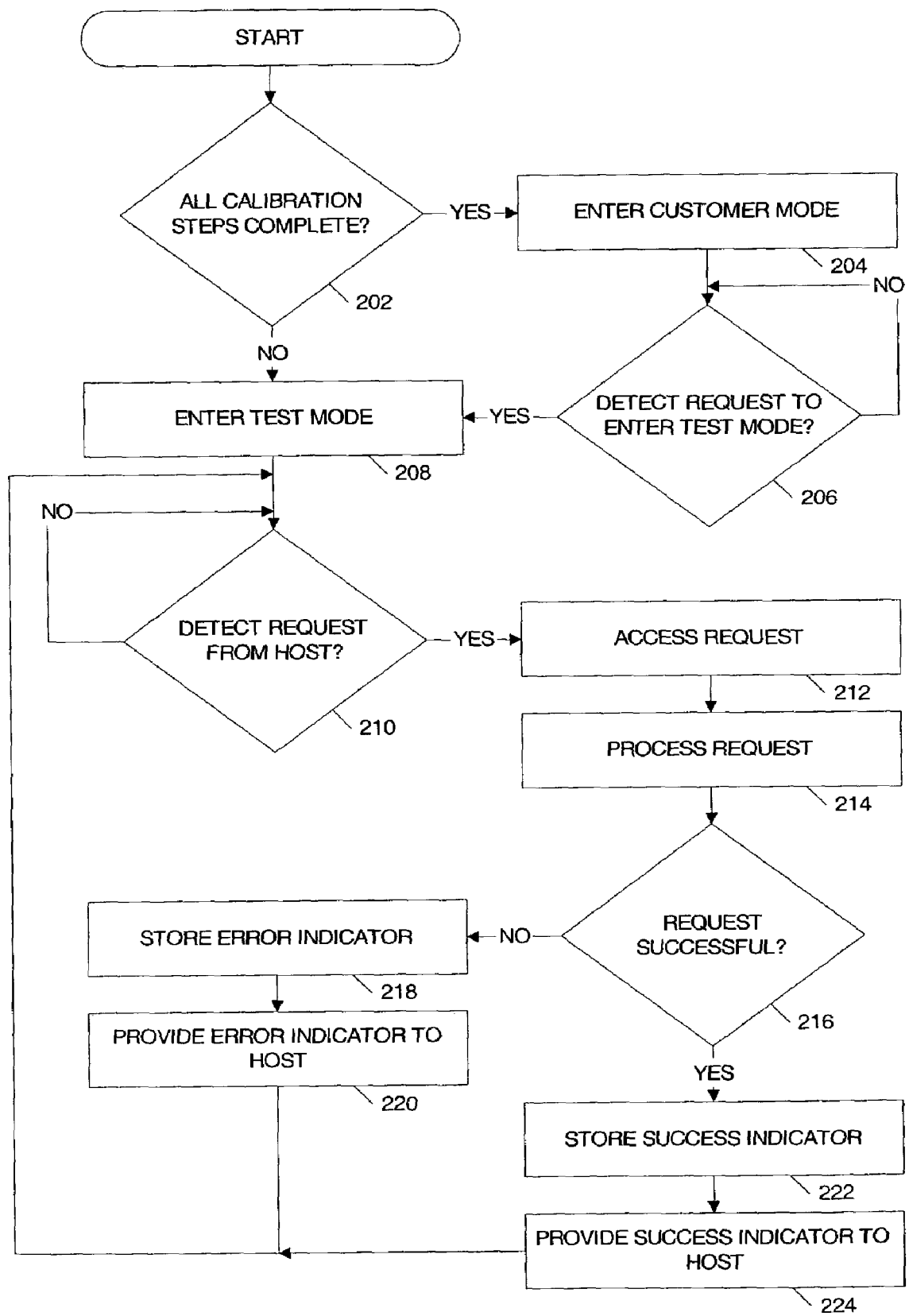
FIG. 2 is a flow chart illustrating an embodiment of a method for changing modes of operation in a transceiver.

FIG. 2 is a flow chart illustrating an embodiment of a method for changing modes of operation in a transceiver. The embodiment of the method of FIG. 2 will be described with reference to FIG. 1. In FIG. 2, a determination is made by controller 126 as to whether all calibration steps of transceiver 120 have been completed as indicated in a block 202. This determination may be made in response to transceiver 120 being powered up (i.e. turned on) or reset.

If all calibration steps of transceiver 120 have been completed, then transceiver 120 enters a customer mode of operation as indicated in a block 204. A determination is made as to whether controller 126 detects a request to enter test mode from host 110 as indicated in a block 206. If controller 126 detects a request to enter test mode, then transceiver enters a test mode of operation as indicated in a block 208.

If all calibration steps of transceiver 120 have not been completed, then transceiver 120 enters the test mode of operation indicated in block 208. A determination is made as to whether controller 126 has detected a request from host 110 as indicated in a block 210. Controller 126 may detect the request by polling flag 146. If controller 126 has not detected a request from host 110, then the method repeats the function of block 210 at a later time. If controller 126 has detected a request from host 110, then controller 126 accesses the request as indicated in a block 212. Controller 126 accesses the request from memory 134. Controller 126 processes the request as indicated in a block 214.

A determination is made as to whether the request was completed successfully as indicated in a block 216. If the request was not completed successfully, then controller 126 causes an error indicator to be stored in memory 144 as indicated in a block 218. Controller 126 also causes an error indicator to be provided to host 110 as indicated in a block 220. The error indicator is provided to host 110 using memory 134 and interface 136.

If the request was completed successfully, then controller 126 causes a success indicator to be stored in memory 144 as indicated in a block 222. Controller 126 also causes a success indicator to be provided to host 110 as indicated in a block 224. The success indicator is provided to host 110 using memory 134 and interface 136.

Figure 3:
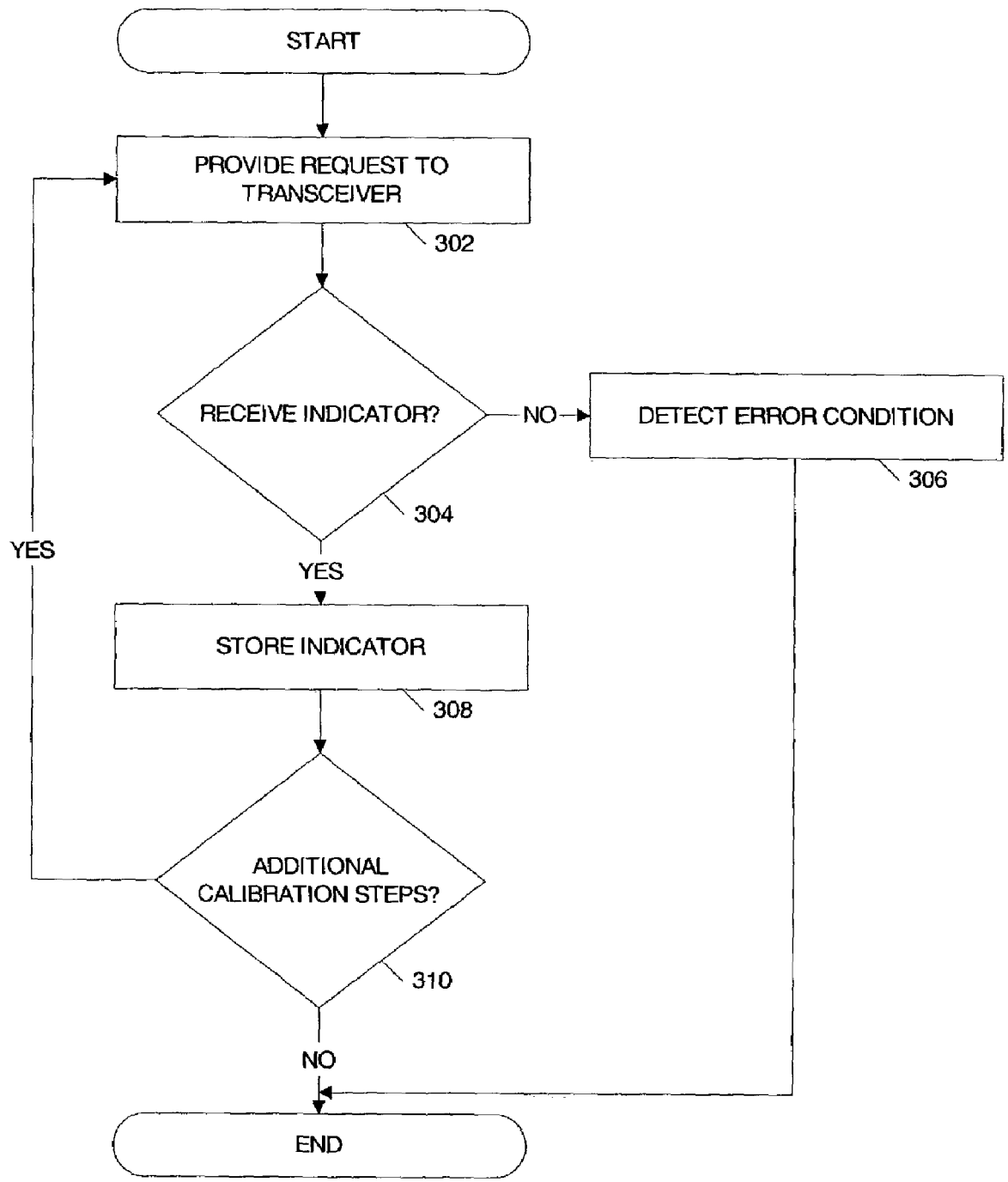
FIG. 3 is a flow chart illustrating an embodiment of a method for interacting with a transceiver in a test mode of operation.

FIG. 3 is a flow chart illustrating an embodiment of a method for interacting with a transceiver in a test mode of operation. The embodiment of the method of FIG. 3 will be described with reference to FIG. 1. In FIG. 3, host 110 provides a request to transceiver 120 as indicated in a block 302. The request may be a request to perform a calibration step or a request to enter test mode. A request to enter test mode causes transceiver 120 to enter the test mode of operation and a request to perform a calibration step causes the calibration step to be performed on transceiver 120. A determination is made by host 110 as to whether host 110 has received an indicator associated with the request as indicated in a block 304. If host 110 has not received an indicator associated with the request, then host 110 detects an error condition associated with transceiver 120 as indicated by a block 306 and the method ends. If host 110 does not receive the indicator, then an error condition may be assumed because transceiver 120 is configured to provide the indicator in response to performing the calibration step whether or not the calibration step is successful.

If host 110 has received an indicator associated with the request, then host 110 stores the indicator as indicated in a block 308. A determination is made by host 110 as to whether there are additional calibration steps to be performed as indicated in a block 310. If there are additional calibration steps to be performed, then the method repeats the function of block 302. If there are no additional calibration steps to be performed, then the method ends.

Figure 4:
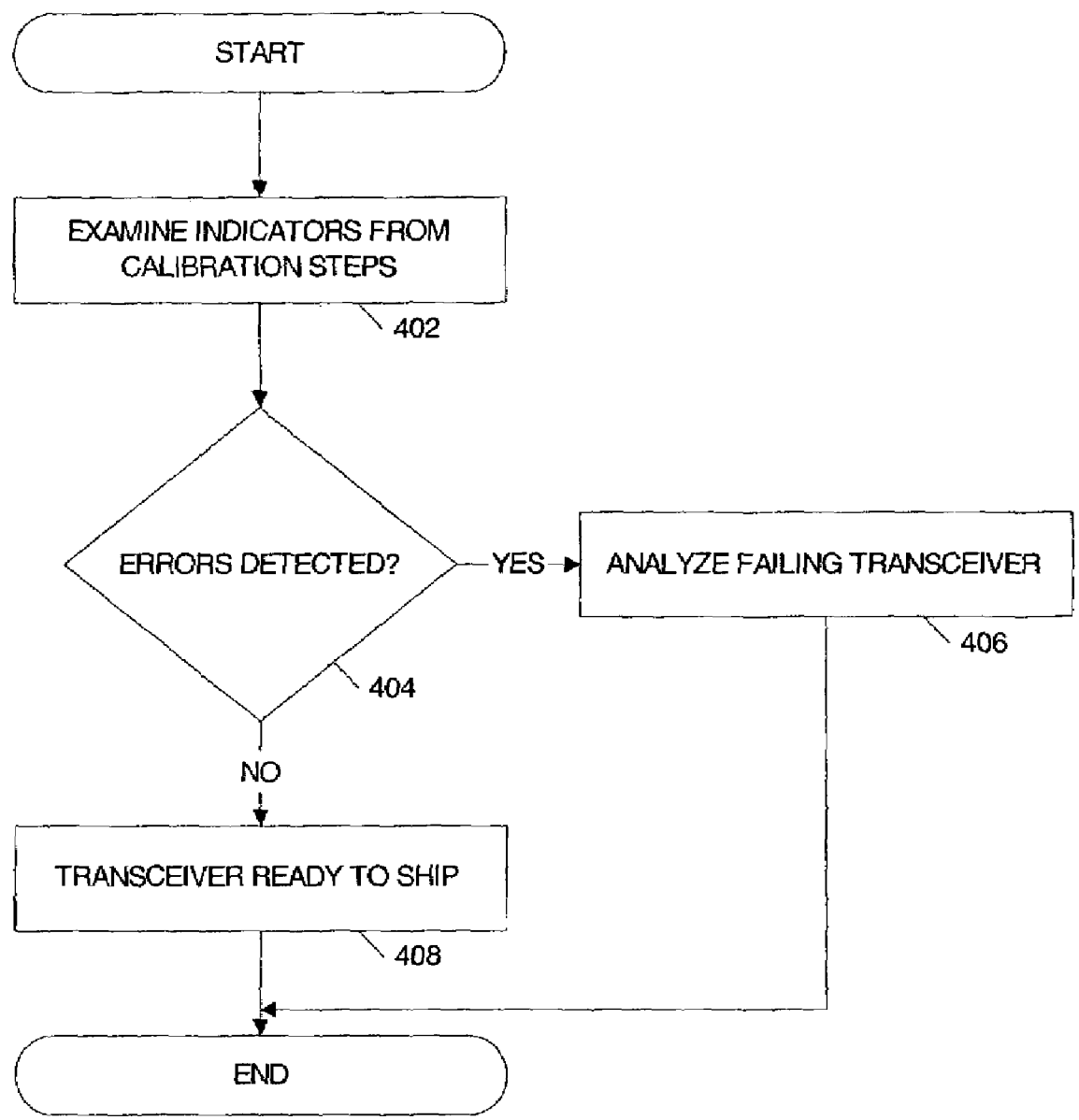
FIG. 4 is a flow chart illustrating an embodiment of a method for detecting errors from a test mode of operation of a transceiver.

FIG. 4 is a flow chart illustrating an embodiment of a method for detecting errors from a test mode of operation of a transceiver. The embodiment of the method of FIG. 4 will be described with reference to FIG. 1. In FIG. 4, host 110 examines the stored indicators from the calibration steps as indicated in a block 402. A determination is made by host 110 as to whether any errors were detected using the indicators as indicated in a block 404. If any errors were detected, then host 110 analyzes the failing transceiver 120 as indicated by a block 406 and the method ends. If no errors were detected, then host 110 indicates that transceiver 120 is ready to ship as indicated in a block 308.

In an alternative embodiment of FIG. 4, host 110 may detect an error immediately in response to storing an indicator associated with a calibration step. In response to the error, host 110 may attempt to repair the failure or may perform one or more failure analysis functions on failing transceiver 120.

Figure 5:
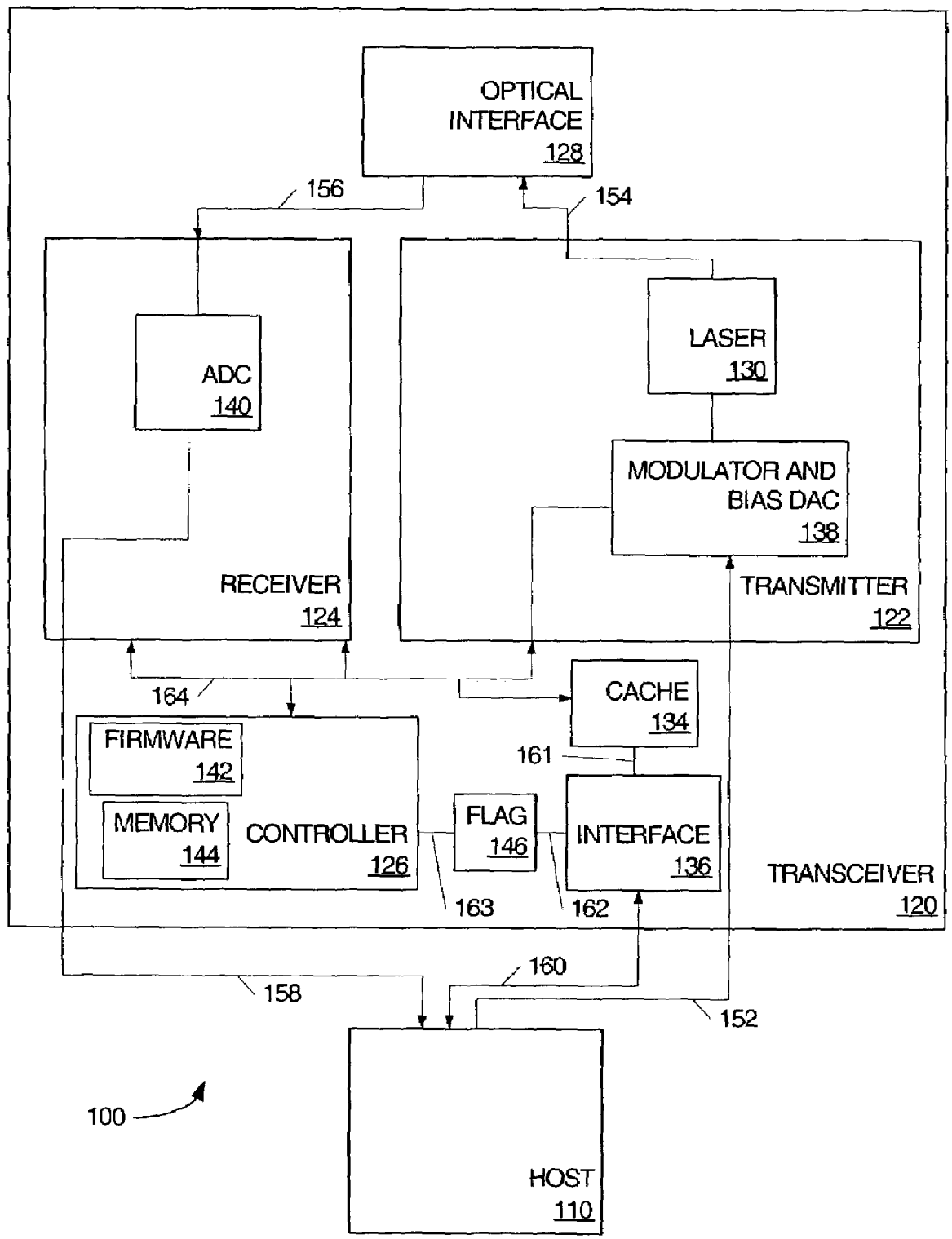
FIG. 5 is a block diagram illustrating an alternative embodiment of a system that includes a transceiver with a test mode of operation.

FIG. 5 is a block diagram illustrating an alternative embodiment of a system that includes a transceiver with a test mode of operation. The embodiment of FIG. 5 operates in substantially the same way as the embodiment of FIG. 1 as described with reference to FIGS. 2-4. In FIG. 5, however, cache 134 and interface 136 are not included in transmitter 122. This embodiment illustrates that cache 134 and interface 136 may be included in any other portion or component transceiver 120.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system comprising:

a host;

an optical transceiver including an Inter-Integrated Circuit (I2C) interface, a controller, a controller memory, and a flag, the controller coupled to a transceiver cache via a two-way connection; and an I2C connection coupled to the host and the I2C interface;

wherein the I2C interface is configured to receive a first request from a host using the I2C connection and store the first request in the transceiver cache, wherein the I2C interface is configured to cause the flag to be set in response to receiving the first request, wherein the controller is configured to access the first request in response to polling the flag, and wherein the controller is configured to cause a test mode of operation to be entered in response to processing the first request.

2. The system of claim 1 wherein the first request is configured to cause the optical transceiver to enter the test mode of operation.

3. The system of claim 1 wherein the optical transceiver operates in a customer mode of operation prior to entering the test mode of operation.

4. The system of claim 1 wherein the optical transceiver is configured to receive a second request from the host and store the second request in the transceiver cache, wherein the controller is configured to access the second request in response to polling the flag, and wherein the controller is configured to perform a calibrating step in response to processing the second request.

5. The system of claim 4 wherein the calibration step includes storing information received from the host in the optical receiver.

6. The system of claim 4 wherein the calibration step includes calibrating a component of the optical transceiver.

7. The system of claim 4 wherein the optical transceiver is configured to store an indicator in the controller memory, the indicator associated with the second request in response to performing the calibration step, and wherein the indicator indicates whether the calibration step was performed successfully by the optical transceiver.

8. The system of claim 4 wherein the optical transceiver is configured to provide an indicator associated with the second request in the transceiver cache in response to performing the calibration step, wherein the I2C interface is configured to access the indicator from the transceiver cache and provide the indicator to the host, and wherein the host is configured to determine whether the calibration step was performed successfully by the optical transceiver using the indicator.

9. A transceiver comprising:
a controller including a controller memory coupled to a transceiver cache via a two-way connection, the transceiver cache including first information;
a flag;
an Inter-Integrated Circuit (I2C) interface configured to receive the first information from a host, provide the first information to the transceiver cache, and set the flag in response to providing the first information to the transceiver cache; and
a laser configured to receive electrical signals from the host and configured to generate optical signals in response to the first information indicating that a calibration step has not been completed.

10. The transceiver of claim 9 wherein the controller is configured to access the first information in response to being powered up.

11. The transceiver of claim 9 wherein the controller is configured to enter a customer mode of operation in response to the first information indicating that the calibration step has been completed.

12. The transceiver of claim 9 wherein the I2C interface is configured to receive a request associated with the calibration step from a host, wherein the I2C interface is configured to store the request in the transceiver cache and set the flag, and wherein the controller is configured to perform the first calibration step in response to receiving the request.

13. The transceiver of claim 12 wherein the controller is configured to enter a customer mode of operation in response to performing the first calibration step.

14. The transceiver of claim 12 wherein the controller is configured to provide an indicator to the host in response to detecting an error associated with the calibration step.

15. The transceiver of claim 12 wherein the controller is configured to provide an indicator to the host in response to detecting that the calibration step has completed successfully.

16. A system comprising:
a host;
an optical transceiver coupled to the host and including an Inter-Integrated Circuit (I2C) interface, a controller, a controller memory and a flag, the controller coupled to a transceiver cache via a two-way connection; and
an I2C connection coupled to the host and the I2C interface;
wherein the host includes a first means for providing a request to the optical transceiver during a test mode of operation of the optical transceiver using the I2C connection, wherein the I2C interface is configured to set the flag in response to receiving the request, wherein the optical transceiver includes a second means for processing the request in response to polling the flag, and wherein the optical transceiver includes a third means for providing an indicator associated with the request to the host.

17. The system of claim 16 wherein the second means is for accessing the request.

18. The system of claim 16 wherein the second means for causing the optical transceiver to enter a customer mode of operation is in response to determining that all calibration steps have been performed.

19. The system of claim 16 wherein the optical transceiver includes a transmitter configured to receive electrical signals from the host and configured to generate optical signals in response to the electrical signals.

\* \* \* \* \*